US008654200B2

(12) United States Patent
Tsubusaki

(10) Patent No.: US 8,654,200 B2
(45) Date of Patent: Feb. 18, 2014

(54) IMAGING APPARATUS WITH SHAKE DETECTION

(75) Inventor: Akihiro Tsubusaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/250,933

(22) Filed: Sep. 30, 2011

(65) Prior Publication Data

US 2012/0019679 A1    Jan. 26, 2012

Related U.S. Application Data

(63) Continuation of application No. 11/044,400, filed on Jan. 27, 2005, now Pat. No. 8,059,156.

(30) Foreign Application Priority Data

Feb. 3, 2004    (JP) ................................. 2004-026921

(51) Int. Cl.
    *H04N 5/228* (2006.01)
(52) U.S. Cl.
    USPC .................................................. 348/208.12
(58) Field of Classification Search
    USPC .......................................... 348/208.12, 208.5
    See application file for complete search history.

(56) References Cited

U.S. PATENT DOCUMENTS

| 5,596,366 | A | * | 1/1997 | Takashima et al. | ...... 348/208.16 |
| 5,701,521 | A | * | 12/1997 | Ohishi et al. | .................... 396/52 |
| 5,794,081 | A | * | 8/1998 | Itoh et al. | ........................ 396/55 |
| 5,933,660 | A | * | 8/1999 | Shiomi | .......................... 396/55 |
| 6,111,609 | A | * | 8/2000 | Stevens | ........................ 348/372 |
| 6,600,876 | B2 | * | 7/2003 | Sato | ................................ 396/55 |
| 6,628,336 | B2 | * | 9/2003 | Hamamura | ................... 348/371 |
| 2002/0008765 | A1 | * | 1/2002 | Ejima et al. | .................. 348/239 |

FOREIGN PATENT DOCUMENTS

JP    2001326849 A    * 11/2001

* cited by examiner

*Primary Examiner* — Gary C Vieaux
(74) *Attorney, Agent, or Firm* — Canon U.S.A., Inc., IP Division

(57) ABSTRACT

In an imaging apparatus, a control unit can operate in one of a first mode which corresponds to an image capturing mode and which controls an image-blur correcting unit, and a second mode corresponding to a playback mode. When the image capturing mode is switched to the playback mode, the control unit operates in the first mode during a predetermined time after switching to the playback mode, and then operates in the second mode after the predetermined time period has elapsed. This makes it possible to immediately obtain an anti-shake effect even if the playback mode is switched to the image capturing mode.

6 Claims, 3 Drawing Sheets

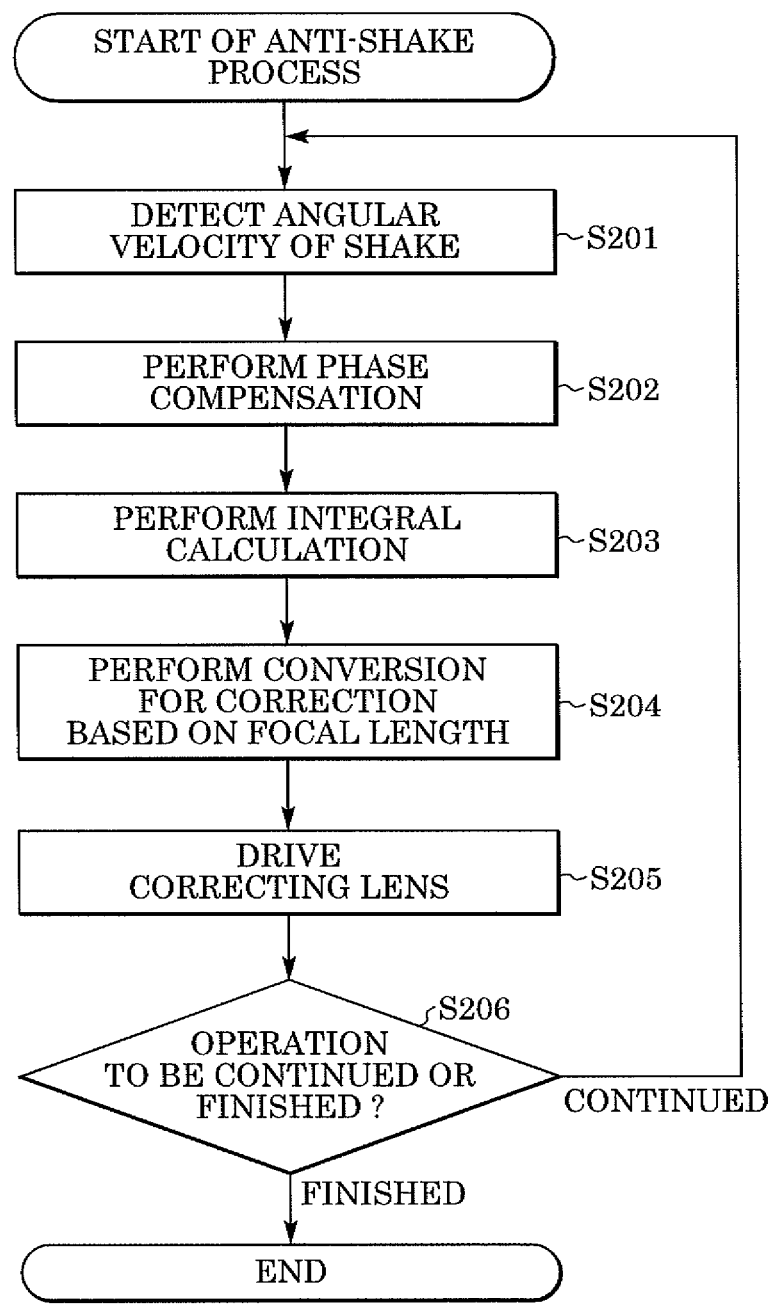

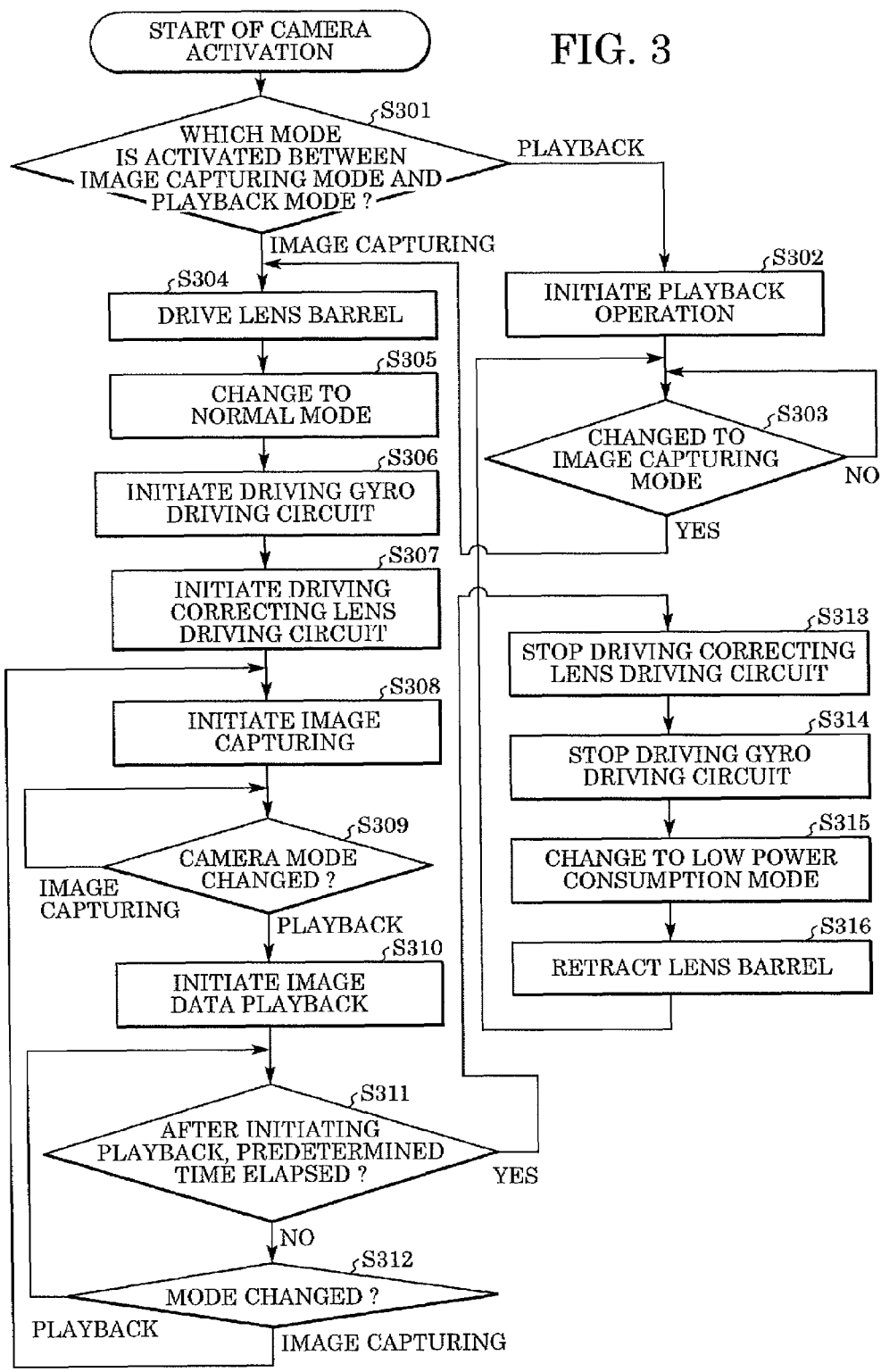

IMAGING APPARATUS WITH SHAKE DETECTION

CROSS REFERENCE TO RELATED APPLICATIONS

This application is a Continuation of U.S. patent application Ser. No. 11/044,400 filed Jan. 27, 2005, now U.S. Pat. No. 8,059,156, which claims priority to Japanese Patent Application No. 2004-026921 filed Feb. 3, 2004, each of which are hereby incorporated by reference herein in their entireties.

BACKGROUND OF THE INVENTION

1. Field of the Invention

The present invention relates to imaging apparatuses, and in particular, to an imaging apparatus suitable for correcting image blurring caused by shaking of the imaging apparatus.

2. Description of the Related Art

When an image is captured by a camera, camera shake may cause image deterioration. To prevent this image deterioration, an image-blur correcting device for optically correcting image blurring has been developed.

The image-blur correcting device includes a shake detecting sensor having an angular velocity sensor for detecting camera shake, a correction calculation unit including an integrator for converting information detected by the sensor into a signal representing a driving position (target position) of a correcting lens, and a lens driving unit including a driving circuit and an actuator for driving the correcting lens.

A vibrating gyro sensor or the like is used as the angular velocity sensor. By integrating an output signal sent as velocity information from the gyro sensor, the output signal can be converted into positional information. By controlling the correcting lens to track the position represented by the positional information, an image-blur correcting operation is realized.

When a single-chip microcomputer separate from other functions serves as a device for performing operations such as integral calculation and on-and-off management of an image-blur correcting operation (anti-shake operation), in many cases that microcomputer consumes a current of 20 milliamperes or greater. When a detection circuit and a driving circuit operate, a current of several tens of milliamperes or greater is consumed as a circuit consumption current.

In portable products, such as digital cameras, it is common that batteries are used, such as lithium-ion batteries or nickel-cadmium batteries. When a product uses a power supply having limited power, such as a battery, consumption of unnecessary power prevents the product from being used for a long time.

To solve the above problems, two types of imaging apparatuses of the related art are known. In one type (e.g., Japanese Patent Laid-Open No. 7-294982, corresponding U.S. Pat. No. 5,701,521), after completing an image capturing operation, a microcomputer is switched to a low power consumption mode. In the other type (e.g., Japanese Patent Laid-Open No. 2001-169176), a controller is changed in response to a playback operation.

In the case of stopping an anti-shake operation when switching the image capturing mode to a playback mode for displaying the captured image data, a certain amount of time is required until the next anti-shake operation is performed. This required time includes the time required for a camera-shake-detecting angular sensor to become stabilized, the convergence time required for arithmetic operations for control, and a reset operation time for the correcting lens.

When a desired scene, whose image is to be captured, appears for only a short time after switching the image capturing mode to the playback mode, the playback mode must be switched to the image capturing mode again for image capturing. However, in a case where the anti-shake operation is immediately stopped on switching to the playback mode, as in the related art, when the playback mode is switched to the image capturing mode just after that, the image-blur correcting device cannot be immediately operated, so that a certain amount of time is required, as described above. In this case, image capturing with the anti-shake operation activated is not possible, thus causing the possibility of losing a photographing opportunity.

In addition, when image capturing is performed before the above time elapses, the captured image may have image deterioration since image blurring occurs due to the fact that image blurring is not corrected.

SUMMARY OF THE INVENTION

The present invention is directed to an imaging apparatus which, after an image capturing mode is switched to a playback mode and then back to the image capturing mode, performs immediate image capturing in a state in which an image-blur correcting unit operates.

According to one aspect of the present invention, an imaging apparatus capable of operating in at least one of an image capturing mode to capture an image and a playback mode to playback the captured image is provided. The imaging apparatus includes an image-blur correcting unit for correcting blurring of the captured image, and a control unit for controlling the image-blur correcting unit. The control unit controls the image-blur correcting unit to operate in at least one of a first mode which corresponds to the image capturing mode, and a second mode corresponding to the playback mode. The control unit controls the image-blur correcting unit so that, responsive to the image apparatus switching operation from the image capturing mode to the playback mode, the image-blur correcting unit operates in the first mode during a predetermined time after the switching to the playback mode, and then operates in the second mode after the predetermined period has elapsed.

The present invention is also directed to a method of controlling an imaging apparatus. In another aspect, a method of controlling an imaging apparatus that is operable in an image capturing mode and a playback mode is provided. The method includes determining whether the imaging apparatus is set to the image capturing mode or the playback mode at activation of the imaging apparatus. If it is determined that the imaging apparatus is set to the image capturing mode at activation, the method includes activating an anti-shaking mode of the imaging apparatus and then initiating image capturing. The method also includes determining whether the image capturing mode has been switched to the playback mode. If it is determined that the image capturing mode has been switched to the playback mode, the method includes measuring a time value from time of switching to the playback mode. If the time value measured in the measuring step is equal to or greater than a predetermined time, then the method includes deactivating the anti-shaking mode of the imaging apparatus. If the time value measured in the measuring step is less than the predetermined time, then the method includes determining whether the playback mode as been switched to the image capturing mode. If it is determined that the image playback mode has been switched to the image capturing mode, then the method includes initiating image capturing.

Further features and advantages of the present invention will become apparent from the following description of exemplary embodiments with reference to the attached drawings.

BRIEF DESCRIPTION OF THE DRAWINGS

FIG. 2 is a flowchart illustrating an anti-shake operation of the camera shown in FIG. 1.

FIG. 3 is a flowchart illustrating driving of a lens barrel and an image-blur correcting unit.

DESCRIPTION OF THE EMBODIMENT

Figure 1:
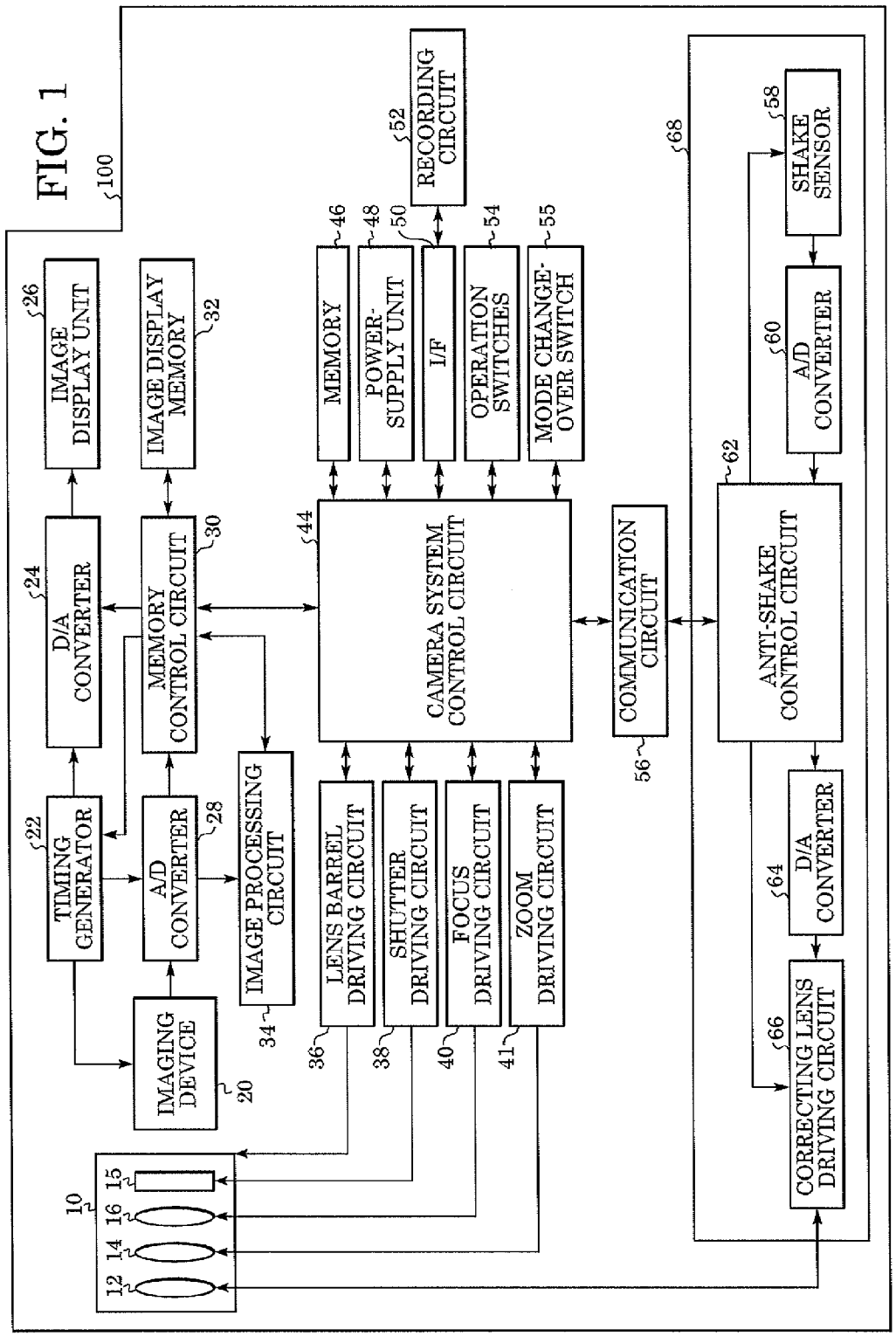
FIG. 1 is a block diagram showing a camera according to one embodiment of the present invention.

An embodiment of the present invention is described below with reference to the accompanying drawings.

FIG. 1 is a block diagram showing a camera 100 (imaging apparatus) according to one embodiment of the present invention.

The camera 100 has a lens barrel 10 therein. The lens barrel 10 includes a correcting lens 12 (optical element), a zoom lens 14, a focus lens 16, and a shutter 15 having a diaphragm function.

The zoom lens 14 and the focus lens 16 are driven by a motor (not shown) to move in an optical axis direction, whereby the zoom lens 14 changes the focal length of an imaging optical system and the focus lens 16 performs focusing. The correcting lens 12 can move in a plane orthogonal to the optical axis in order to correct image blurring.

An imaging device 20 can be a charge-coupled device or a complementary metal oxide semiconductor. An optical image formed by the imaging optical system in the lens barrel 10 is converted into an electrical signal by the imaging device 20. An analog-to-digital (A/D) converter 28 converts an analog output signal from the imaging device 20 into a digital signal.

Under the control of a memory control circuit 30 and a camera system control circuit 44, a timing generator 22 supplies a clock signal and a control signal to the imaging device 20, a digital-to-analog (D/A) converter 24, and the A/D converter 28.

An image display unit 26 can be a TFT (thin film transistor) liquid crystal display or the like. The image display unit 26 displays captured image data and specific information (e.g., image capturing information). Image data for display, or the like, stored in an image display memory 32 is output and displayed on the image display unit 26 through the D/A converter 24 under the control of the memory control circuit 30. By sequentially displaying image data generated by an output signal from the imaging device 20, an electronic finder function can be realized.

Under the control of the camera system control circuit 44, the memory control circuit 30 performs data input and output control for the timing generator 22, the D/A converter 24, the A/D converter 28, the image display memory 32, and an image processing circuit 34.

The image processing circuit 34 performs predetermined pixel interpolation and color conversion on an output signal from the A/D converter 28 or data from the memory control circuit 30. This generates image data.

The camera system control circuit 44 controls driving of a lens barrel driving circuit 36, a shutter driving circuit 38, a focus driving circuit 40, and a zoom driving circuit 41 in response to an operation by operation switches 54 (including a plurality of switches, which are described later).

The lens barrel driving circuit 36 drives the lens barrel 10 in response to the status of the camera 100. Specifically, when the power to the camera 100 is off, the lens barrel driving circuit 36 retracts the lens barrel 10 (retracted state). When the power to the camera 100 is turned on, the lens barrel driving circuit 36 drives the lens barrel 10 to be in a state (image capturing state) capable of image capturing.

The camera system control circuit 44 calculates exposure values (a diaphragm stop and a shutter speed) based on brightness information obtained by image processing in the image processing circuit 34. The camera system control circuit 44 controls driving of the shutter 15 by using the shutter driving circuit 38. This performs automatic exposure control.

Based on focusing information on the imaging optical system (detected contrast) obtained by image processing in the image processing circuit 34, the camera system control circuit 44 uses the focus driving circuit 40 to control driving of the focus lens 16. This performs autofocus control, etc.

The camera system control circuit 44 uses the zoom driving circuit 41 to control driving of the zoom lens 14 based on an amount of operation by, among the operation switches 54, the operation switches (a zoom lever and a zoom button) for issuing a zooming instruction and a direction of the operation. The camera system control circuit 44 uses a communication circuit 56 to convey, to a anti-shake control circuit 62, information of the image capturing/playback state of the camera 100, zooming position information, the on/off state of a release switch among the operation switches 54.

A memory 46 stores still image data and moving image data obtained by image capturing. The storage capacity of the memory 46 is sufficient to store data of a predetermined number of still images and data of moving images for a predetermined time. The memory 46 enables high speed storage of large amounts of image data even in the cases of continuous image capturing and panoramic exposure in which data of plural consecutive still images is generated. The memory 46 can be used as a work area for the camera system control circuit 44.

A power-supply unit 48 includes a battery detecting circuit, a DC-DC converter, and a switch circuit for switching a block to be supplied with power. The power-supply unit 48 detects installation of a battery, a battery type, remaining battery power, etc. Based on detecting a battery and a command from the camera system control circuit 44, the power-supply unit 48 controls driving of the DC-DC converter to supply necessary power (voltage and current) to each portion of the camera 100 including a recording medium only in the required period.

An interface (I/F) 50 is used to interface with a recording medium such as a memory card or a hard disk. A recording circuit 52 is used to record image data or the like on the recording medium. The recording circuit 52 can access the camera system control circuit 44 through the interface 50.

A mode change-over switch 55 is operated by a photographer in order to change between the image capturing mode and the playback mode. The mode change-over switch 55 instructs the camera system control circuit 44 to set either mode in response to the state of the mode change-over switch 55. In the playback mode, image data recorded on the recording medium is played back. Accordingly, the playback mode differs from a mode (so-called "quick review playback") in which, immediately after capturing an image in the image capturing mode, the captured image data is displayed on the image display unit 26.

FIG. 2 is a flowchart illustrating an anti-shake process of the camera 100 in this embodiment. The configuration of an image-blur correcting unit 68 is also described in accordance with the flow of the process.

A shake sensor 58 includes a vibration gyro and a gyro driving circuit, and detects an angular velocity in accordance with a shake (such as a hand shake) of the camera 100 (step S201). Shake information detected by the shake sensor 58 is inputted to the anti-shake control circuit 62 through an A/D converter 60. The shake sensor 58 can stop and restart a detecting operation in response to an instruction from the anti-shake control circuit 62.

The anti-shake control circuit 62 is formed by a single-chip microcomputer separate from the camera system control circuit 44. The anti-shake control circuit 62 performs phase compensation or the like on a phase lag occurring in the entire image-blur correcting control system including the shake sensor 58 and a correcting lens driving circuit 66 (step S202).

By integrating angular velocity information of the shake detected by the shake sensor 58, the anti-shake control circuit 62 converts the angular velocity information into positional information (information concerning a target driving position of the correcting lens 12) (step S203). The positional information obtained is inputted to the correcting lens driving circuit 66 through a D/A converter 64.

In addition, the anti-shake control circuit 62 reflects, in a displacement value of the correcting lens 12, information received from the camera system control circuit 44 through the communication circuit 56, for example, information concerning a zoom position of the lens barrel 10 and whether a converter lens is mounted (step S204). In other words, based on the information concerning the zoom position, etc., the target driving position of the correcting lens 12 is corrected.

The anti-shake control circuit 62 can also stop and restart the gyro driving circuit of the shake sensor 58 and a lens driving circuit for driving the correcting lens 12 in response to the image capturing/playback state of the camera 100 received from the camera system control circuit 44. The power mode of the single-chip microcomputer forming the anti-shake control circuit 62 can be switched between a low power consumption mode (mode in which supply of power to the anti-shake control circuit 62 is suppressed) and a normal mode (mode in which supply of power to the anti-shake control circuit 62 is permitted).

Based on a command from the anti-shake control circuit 62, the correcting lens driving circuit 66 drives the correcting lens 12 so as to correct an amount of shift (amount of image blurring) calculated in the anti-shake control circuit 62. In other words, the correcting lens driving circuit 66 drives the correcting lens 12 so as to cancel the image blurring (step S205). This can suppress image deterioration caused by image blurring.

Driving control of the correcting lens 12 by the anti-shake control circuit 62 through the correcting lens driving circuit 66 is realized mainly by feedback control. Specifically, in response to an output from a detecting sensor for detecting the position of the correcting lens 12, the anti-shake control circuit 62 acquires the present position of the correcting lens 12, and uses the correcting lens driving circuit 66 to drive the correcting lens 12 so that the deviation between the present position and the target position (lens correcting value) of the correcting lens 12 is substantially zero.

The detecting sensor for detecting the position of the correcting lens 12 can include, for example, a Hall device or the like. The above feedback control can be substituted by performing digital control in the single-chip microcomputer forming the anti-shake control circuit 62.

The anti-shake operation is performed based on an operation on an anti-shake on/off switch among the operation switches 54. The anti-shake operation is continuously performed until a command to stop the anti-shake operation is sent from the camera system control circuit 44 to the anti-shake control circuit 62 (step S206).

FIG. 3 is a flowchart illustrating an operation in accordance with the playback mode and the image capturing mode in this embodiment. Until the camera 100 is activated, the lens barrel 10 is in a retracted state, and the anti-shake control circuit 62 is in the low power consumption mode. A gyro driving circuit and the correcting lens driving circuit 66 are in a driving-stopped state.

In step S301, it is determined which of the image capturing mode and the playback mode is activated when the camera 100 is activated. If the image capturing mode is activated, the process proceeds to step S304. If the playback mode is activated, the process proceeds to step S302. The determination in step S301 is performed by the camera system control circuit 44.

In step S302, a playback operation is initiated in which image data recorded on a recording medium is read and displayed on the image display unit 26. At this time, by operating the operation switches 54, the image data recorded on the recording medium can be deleted and edited, the display area can be enlarged and reduced, and an image to be read can be selected.

In step S303, it is determined whether or not the mode of the camera 100 has been changed by operating the mode change-over switch 55. In other words, it is determined whether the playback mode has been switched to the image capturing mode. If the mode of the camera 100 has been changed by operating the mode change-over switch 55, the process proceeds to step S304. If the playback mode remains unchanged, the determination in step S303 is repeatedly performed.

In step S304, the camera 100 is set to the image capturing mode. Thus, the camera system control circuit 44 controls the lens barrel 10 to be in an image capturing state by using the lens barrel driving circuit 36 to drive the lens barrel 10.

In step S305, the single-chip microcomputer forming the anti-shake control circuit 62 is switched from the low power consumption mode to the normal mode to initiate the operation of the anti-shake control circuit 62.

In steps S306 and S307, under the control of the anti-shake control circuit 62, driving of the gyro driving circuit of the shake sensor 58 and driving of the correcting lens driving circuit 66 are initiated. When step S307 is finished, the image-blur correcting unit 68 enters a state capable of performing an anti-shake operation.

In step S308, driving of the imaging device 20 is initiated, and image data inputted from the image display storage circuit 32 is displayed in an electric view finder (EVF) formed on the image display unit 26. This allows the camera 100 to be in a state capable of image capturing. When an anti-shake function is set by operating the anti-shake on/off switch among the operation switches 54, the anti-shake control circuit 62 starts the process shown in FIG. 2 to perform the anti-shake operation.

Conversely, when the anti-shake function is not set, the correcting lens 12 is fixed so that the center of the correcting lens 12 is the position of the optical center of the image capturing optical system. In other words, the correcting lens 12 is prevented from moving in a plane orthogonal to the optical axis.

In step S309, it is determined whether or not the camera mode has been changed. In other words, it is determined whether or not the image capturing mode has been changed to the playback mode. If the mode has not been changed (i.e., if the image capturing mode remains unchanged), the determination in step S309 is repeatedly performed. If the mode has been changed to the playback mode, the process proceeds to step S310.

In step S310, the operation of playing back the image data is initiated and counting by a timer is initiated. The playback operation in step S310 is similar to that in step S302. In this embodiment, after the playback operation is initiated, that is, the camera has been changed to the playback mode, the image capturing state of the lens barrel 10 remains unchanged.

In step S311, based on the count value of the above timer, the camera system control circuit 44 determines whether or not a predetermined time has elapsed after initiating the playback operation. The predetermined time can be set based on the setting by the manufacturer or can be set based on the setting by the user via the operation switches 54. For example, the predetermined time can be set at five (5) seconds. If the predetermined time has elapsed, the camera system control circuit 44 proceeds to step S313. If the predetermined time has not elapsed, the camera system control circuit 44 proceeds to step S312.

In steps S313 and S314, under the control of the anti-shake control circuit 62, driving of the gyro driving circuit of the shake sensor 58 and driving of the correcting lens driving circuit 66 are stopped. At the time when step S314 is completed, the image-blur correcting unit 68 enters a state of completing the anti-shake operation, that is, a state in which the correcting lens 12 is fixed.

In step S315, the camera system control circuit 44 stops the operation of the anti-shake control circuit 62 by switching the mode of the single-chip microcomputer forming the anti-shake control circuit 62 from the normal mode to the low power consumption mode. As described above, when the predetermined time has elapsed after setting the playback mode, the image capturing operation is not immediately performed and the operation of the image-blur correcting unit 68 is not required. Thus, by switching to the low power consumption mode, the required power can be reduced. This enables the camera 100 to be used for a longer time by suppressing unnecessary power consumption.

In step S316, by using the lens barrel driving circuit 36 to drive the lens barrel 10, the camera system control circuit 44 retracts the lens barrel 10, which is in the image capturing state.

In step S312, it is determined whether or not the camera mode has been changed. That is, it is determined whether or not the mode has been changed to the image capturing mode. If the mode has been changed to the image capturing mode, the process proceeds to step S308 and the camera 100 enters the state capable of image capturing.

When, in a period in which the predetermined time has elapsed, as described above, after switching the camera mode from the image capturing mode to the playback mode (step S309), the playback mode is switched to the image capturing mode, and the process does not proceed to step S313 and thereafter. The operation of the image-blur correcting unit 68 is not stopped and the image capturing state of the lens barrel 10 remains unchanged. When this changes the camera mode from the playback mode to the image capturing mode (steps S312 to S308) during the predetermined time, image capturing can be performed in a state in which the anti-shake operation is performed, and the anti-shake operation in the image-blur correcting unit 68 can produce an image free from image blurring.

In this embodiment, the time required for enabling image capturing in the case of, after switching the camera mode from the image capturing mode to the playback mode, as in the related art, the playback mode is switched to the image capturing mode, that is, the time (the time required for steps S304 to S307) required for changing the state of the lens barrel 10 from the retracted state to the image capturing state and restarting the operation of the image-blur correcting unit 68, can be omitted. This enables the camera 100 to perform image capturing without losing a photographing opportunity. In addition, image data having less image deterioration (less image blurring) can be obtained.

In addition, after the predetermined time elapses after switching the camera mode to the playback mode, by stopping the anti-shake operation, the required power can be reduced by suppressing unnecessary power consumption, compared with a case in which the anti-shake operation is constantly performed also in a state with the playback mode set.

In this embodiment, in step S313, the driving of the correcting lens 12 is stopped. However, the driving range of the correcting lens 12 may be limited (reduced) compared with the case of setting the image capturing mode, and a correcting value (gain) based on the output of the shake sensor 58 may be reduced. Also in this case, power consumption caused by the driving of the correcting lens 12 can be reduced, thus achieving power saving.

In this embodiment, a camera using an imaging device has been described. However, the present invention is applicable to a camera using a film. Moreover, in this embodiment, image blurring can be corrected by moving the correcting lens 12, which is an optical element. However, the present invention is applicable to the case of performing image-blur correction by moving an imaging device in a plane orthogonal to an optical axis.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An imaging apparatus comprising:
a shake detection unit configured to detect shaking;
a compensation member configured to compensate an image-blurring;
a first processor configured to calculate a driving amount to control the compensation member based on a detected shake result detected by the shake detection unit to operate in at least one of a first mode and a second mode which has power consumption less than that in the first mode;
a drive unit configured to drive the compensation member based on the driving amount calculated by the first processor;
a second processor configured to operate in one of an image capturing mode capable of capturing an image and a playback mode for displaying image data stored in a storage medium,
wherein the second processor controls the first processor to operate in the first mode during the image capturing mode and a predetermined time after being operated to the playback mode, and controls the first processor to operate in the second mode after the predetermined period has elapsed, and wherein the first processor controls the drive unit to operate in the first mode during the image capturing mode and a predetermined time after being operated to the playback mode, receives a signal from the second processor to control and controls the drive unit to operate in the second mode after the predetermined period has elapsed and before the first processor is controlled by the second processor to operate in the second mode.

2. The imaging apparatus according to claim 1, wherein, responsive to the imaging apparatus being set to the playback mode at activation of the imaging apparatus, the second processor controls the first processor to operate in the second mode, and wherein, responsive to the imaging apparatus switching from the image capturing mode to the playback mode after activation of the imaging apparatus, the second processor controls the first processor to operate in the first mode during the predetermined time after switching to the playback mode, and then the second processor controls the first processor to operate in the second mode after lapse of the predetermined time.

3. The apparatus according to claim 1, further comprising an operating member facilitating switching between the image capturing mode and the playback mode.

4. The apparatus according to claim 1,
wherein the compensation member is one of a shift lens and an image sensor which is movable in a direction orthogonal to the optical axis.

5. A control method of an imaging apparatus comprises a compensation member configured to compensate an image-blurring, comprising:
detecting shaking;
by a first processor, controlling the compensation member based on a detected shake result to operate in at least one of a first mode and a second mode which has power consumption less than that in the first mode;

by a second processor, operating in one of an image capturing mode capable of capturing an image and a playback mode for displaying image data stored in a storage medium, by a drive unit, driving the compensation member based on the driving amount calculated by the first processor;

wherein, by the second processor, the first processor is controlled to operate in the first mode during the image capturing mode and a predetermined time after being operated to the playback mode, and the first processor is controlled to operate in the second mode after the predetermined period has elapsed, and by the first processor, the drive is controlled to operate in the first mode during the image capturing mode and a predetermined time after being operated to the playback mode, and the first processor receives a signal from the second processor to control the drive unit is controlled to operate in the second mode after the predetermined period has elapsed and before the first processor is controlled by the second processor to operate in the second mode.

6. The imaging apparatus according to claim 5,
wherein, responsive to the imaging apparatus being set to the playback mode at activation of the imaging apparatus, operating in the second mode, and wherein, responsive to the imaging apparatus switching from the image capturing mode to the playback mode after activation of the imaging apparatus, controlling the first processor to operate in the first mode during the predetermined time after switching to the playback mode, and then controlling the first processor to operate in the second mode after lapse of the predetermined time.

* * * * *